(12) United States Patent
Nagano

(10) Patent No.: US 11,006,497 B2
(45) Date of Patent: May 11, 2021

(54) POWER SUPPLY DEVICE

(71) Applicant: OMRON Corporation, Kyoto (JP)

(72) Inventor: Masaaki Nagano, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/392,682

(22) Filed: Apr. 24, 2019

(65) Prior Publication Data

US 2020/0053846 A1 Feb. 13, 2020

(30) Foreign Application Priority Data

Aug. 7, 2018 (JP) .............................. JP2018-148426

(51) Int. Cl.
*H05B 45/37* (2020.01)
*H05B 45/50* (2020.01)
*H02M 3/335* (2006.01)

(52) U.S. Cl.
CPC ........ *H05B 45/37* (2020.01); *H02M 3/33523* (2013.01); *H05B 45/50* (2020.01)

(58) Field of Classification Search
CPC ................ H05B 33/08; H05B 33/0803; H05B 33/0806; H05B 33/0815; H05B 33/0887; H05B 45/37; H05B 45/44; H05B 45/50; H02M 1/4258; H02M 1/096; H02M 3/335; H02M 3/33523
See application file for complete search history.

(56) References Cited

U.S. PATENT DOCUMENTS

| 4,307,606 | A | * | 12/1981 | Johnson ................ G01F 23/247 374/189 |
| 4,716,301 | A | * | 12/1987 | Willmott .................. G05F 1/59 307/115 |
| 7,902,761 | B2 | * | 3/2011 | Ang ........................ H05B 45/37 315/194 |
| 8,680,784 | B2 | * | 3/2014 | Hariharan .......... H05B 33/0815 315/201 |
| 2002/0047593 | A1 | | 4/2002 | Guthrie et al. |

(Continued)

FOREIGN PATENT DOCUMENTS

| CN | 103108441 A | 5/2013 |
| CN | 106097986 A | 11/2016 |

(Continued)

OTHER PUBLICATIONS

Ashutosh Kumar Sinha,"Blown Fuse Indicator," "https://www.electronicsforu.com/electronics-projects/blown-fuse-indicator," Oct. 5, 2017, pp. 1-2 (Year: 2017).*

(Continued)

*Primary Examiner* — Thai Pham
(74) *Attorney, Agent, or Firm* — Metrolex IP Law Group, PLLC

(57) ABSTRACT

A power supply device includes: an input unit configured to receive an input voltage from outside; a power supply unit configured to generate a power-supply voltage from the input voltage inputted through the input unit; an output unit including an output terminal configured to output the power-supply voltage; and a lighting circuit connected to the input unit and configured to be turned on in response to application of the input voltage. The lighting circuit is configured to vary in lighting mode depending on the input voltage.

6 Claims, 3 Drawing Sheets

(56) References Cited

U.S. PATENT DOCUMENTS

| | | | | |
|---|---|---|---|---|
| 2005/0253533 A1* | 11/2005 | Lys | .................... | H05B 33/0815 |
| | | | | 315/224 |
| 2006/0002155 A1* | 1/2006 | Shteynberg | ......... | H02M 1/4258 |
| | | | | 363/21.12 |
| 2007/0205729 A1* | 9/2007 | Garbowicz | ............ | H05B 41/46 |
| | | | | 315/299 |
| 2011/0062871 A1* | 3/2011 | Chen | ...................... | H05B 45/37 |
| | | | | 315/121 |
| 2011/0062888 A1* | 3/2011 | Bondy | .................. | H05B 45/37 |
| | | | | 315/294 |
| 2011/0248640 A1* | 10/2011 | Welten | ............... | H05B 33/0815 |
| | | | | 315/210 |
| 2012/0194077 A1* | 8/2012 | Wei | ........................ | H05B 45/50 |
| | | | | 315/121 |
| 2012/0286940 A1* | 11/2012 | Carmen, Jr. | ......... | F21V 33/0052 |
| | | | | 340/12.5 |
| 2013/0076248 A1 | 3/2013 | Shimizu et al. | | |
| 2013/0113382 A1* | 5/2013 | Kitahara | .......... | H03K 17/08144 |
| | | | | 315/151 |
| 2018/0302963 A1 | 10/2018 | Fu et al. | | |

FOREIGN PATENT DOCUMENTS

| | | |
|---|---|---|
| CN | 107771414 A | 3/2018 |
| DE | 102005053298 A1 | 5/2007 |
| JP | 2006-349626 A | 12/2006 |
| JP | 2007-109483 A | 4/2007 |
| KR | 10-0335190 B | 11/2002 |
| WO | 2016/202665 A1 | 12/2016 |

OTHER PUBLICATIONS

The extended European search report (EESR) dated Oct. 14, 2019 in a counterpart European Patent application.

Office Action dated May 18, 2020 in a counterpart Korean patent application.

Ashutosh Kumar Sinha, "Blown Fuse Indicator I Detailed Circuit Diagram Available", Oct. 5, 2017, www.electronicsforu.corn, Retrieved from the Internet: URL:https://webcache.googleusercontent.com/search? q=cache: hMOWJxPFcgcJ:https://www.electronicsforu.com/electronics-projects/blown-fuse-indicator +&cd=2&hl=de&ct=clnk &gl=de [retrieved on Jul. 10, 2020]; Relevance is indicated in the Office Action dated Jul. 21, 2020 in a counterpart European patent application.

Office Action dated Jul. 21, 2020 in a counterpart European patent application.

Notice of Last Preliminary Rejection dated Nov. 25, 2020 in a counterpart Korean patent application.

Office Action (CNOA) dated Feb. 9, 2021 in a counterpart Chinese patent application.

Anonymous, "4 LED voltage indicator circuits—ElecCircuit.com", Aug. 10, 2017, Retrieved from the Internet: URL: https://web.archive.org/wb/20170810212352/http://www.eleccircuit.com/simple-voltage-indicator-by-led-and-zener-diode/, Retrieved on Mar. 18, 2021, XP55787229; Relevance is indicated in the summons to attend oral proceedings pursuant to Rule 115(1) EPC issued on Mar. 25, 2021.

Summons to attend oral proceedings pursuant to Rule 115(1) EPC dated Mar. 25, 2021 in a counterpart European patent application.

Notice of Allowance and Fee(s) Due dated Mar. 31, 2021 in a related U.S. Appl. No. 16/643,826.

\* cited by examiner

FIG.2

| PATTERN | INPUT 1 | INPUT 2 | OUTPUT 1 | INTERNAL STATE OF POWER SUPPLY |
|---|---|---|---|---|
| 1 | ON | ON | ON | NORMAL STATE |
| 2 | ON | ON | OFF | SHORT CIRCUIT AT OUTPUT / BREAKAGE ON SECONDARY SIDE |
| 3 | ON | OFF | ON | [THIS STATE DOES NOT OCCUR] |
| 4 | ON | OFF | OFF | MELT OF FUSE (BREAKAGE ON PRIMARY SIDE) |
| 5 | OFF | ON | ON | HOLDING TIME [THIS STATE DOES NOT OCCUR] |
| 6 | OFF | ON | OFF | [THIS STATE DOES NOT OCCUR] |
| 7 | OFF | OFF | ON | VOLTAGE EXTERNALLY APPLIED |
| 8 | OFF | OFF | OFF | NO INPUT VOLTAGE |

FIG.3

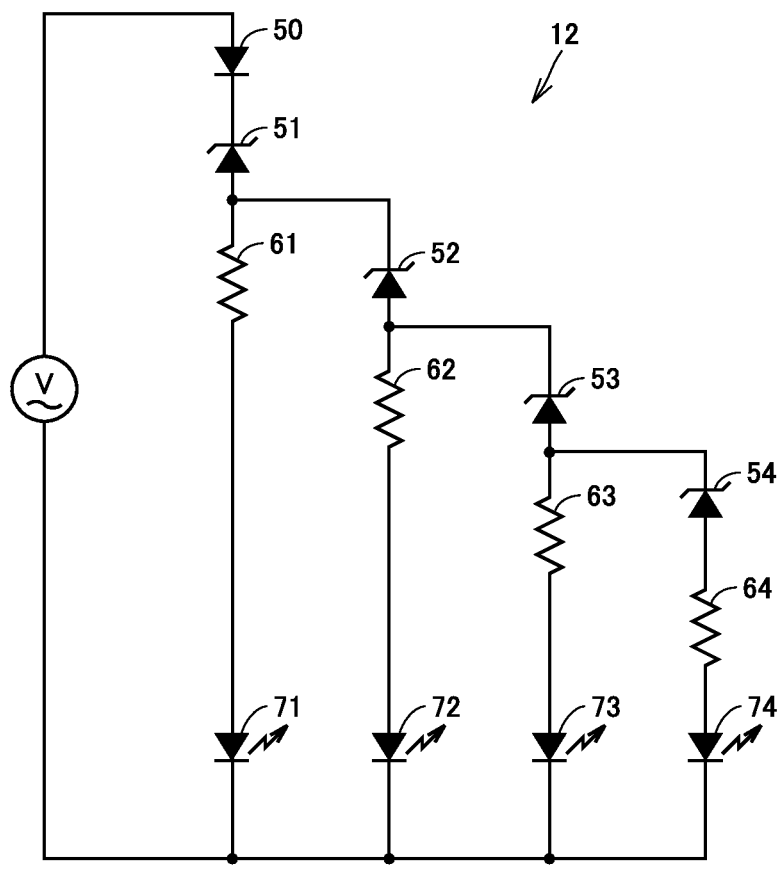

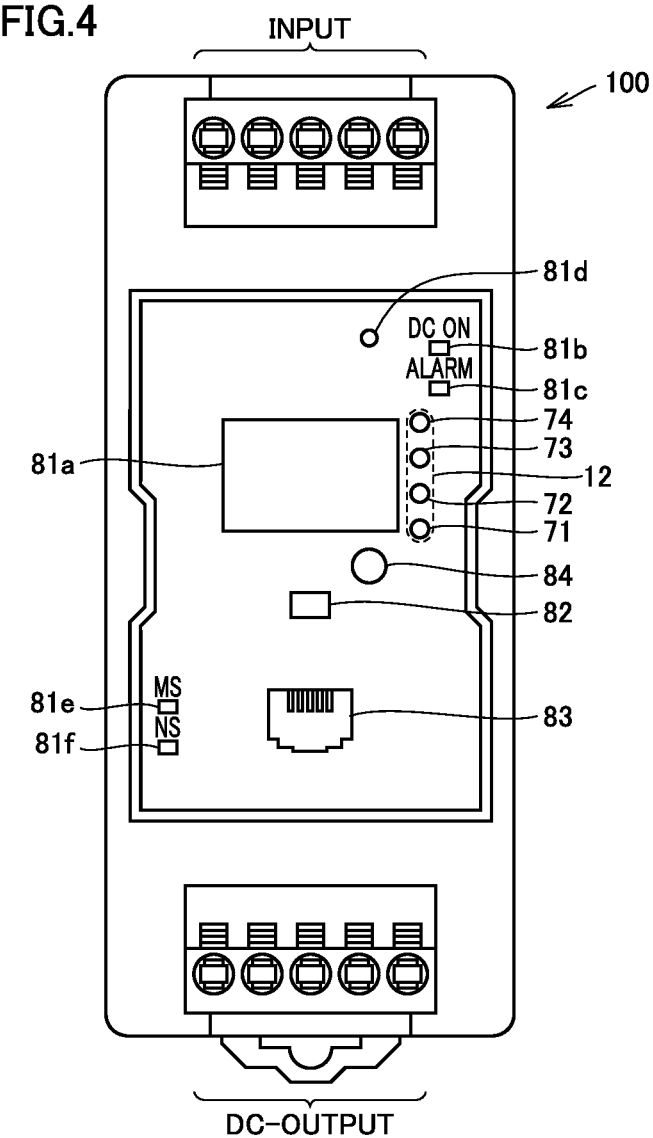

POWER SUPPLY DEVICE

BACKGROUND OF THE INVENTION

Field of the Invention

The present invention relates to a power supply device.

Description of the Background Art

For example, Japanese Patent Laying-Open No. 2006-349626 discloses an implementation circuit that can detect a drop in supply of power-supply voltage. The implementation circuit includes an LED device for monitoring the status of the power-supply voltage, and a lighting control circuit for the LED device. When the power-supply voltage is equal to or more than a prescribed voltage, the lighting control circuit turns on the LED device. When the power-supply voltage is not equal to or more than the prescribed voltage, the lighting control circuit turns off the LED device.

SUMMARY OF THE INVENTION

According to the above-described configuration, the power supply device can notify the user of whether or not a voltage is being inputted to the power supply device. The user, however, cannot know the magnitude of voltage inputted to the power supply device.

At a manufacturing location, for example, interconnections (a plurality of power-supply lines) for different power-supply voltages may be laid. If a power supply device meant for a certain power-supply line (e.g. a line for AC of 230 V) is connected to a power-supply line for a lower voltage (e.g. a line for AC of 115 V), the output or efficiency of the power supply device may reduce.

An object of the present invention is to provide a power supply device that enables the user to easily check the magnitude of the input voltage.

According to one example of the present disclosure, a power supply device includes: an input unit configured to receive an input voltage from outside; a power supply unit configured to generate a power-supply voltage from the input voltage inputted through the input unit; an output unit including an output terminal configured to output the power-supply voltage; and a lighting circuit connected to the input unit and configured to be turned on in response to application of the input voltage. The lighting circuit is configured to vary in lighting mode depending on the input voltage.

According to the above-described configuration, a power supply device that enables the user to easily check the magnitude of the input voltage can be provided. Further, the power supply device requires no circuit for measuring the input voltage value. Thus, the configuration of the power supply device can be simplified, and an increase in cost of the power supply device can be curbed.

In the above-described power supply device, the lighting circuit includes a plurality of light-emitting devices, and the number of light-emitting devices to be turned on among the plurality of light-emitting devices is varied depending on the magnitude of the input voltage.

According to the above-described configuration, the magnitude of the input voltage can be indicated by the number of light-emitting devices to be turned on.

In the above-described power supply device, the lighting circuit further includes a plurality of Zener diodes each connected to a high-voltage side of a corresponding one of the plurality of light-emitting devices, and the plurality of Zener diodes are connected in series.

According to the above-described configuration, the number of light-emitting devices to be turned on can be varied depending on the magnitude of the input voltage.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows lighting patterns of LED circuits according to one embodiment.

FIG. 3 is a circuit diagram showing a configuration example of an LED circuit (lighting circuit) shown in FIG. 1.

FIG. 4 schematically shows one example external appearance of a power supply device according to an embodiment of the present invention.

DESCRIPTION OF THE PREFERRED EMBODIMENTS

Figure 1:
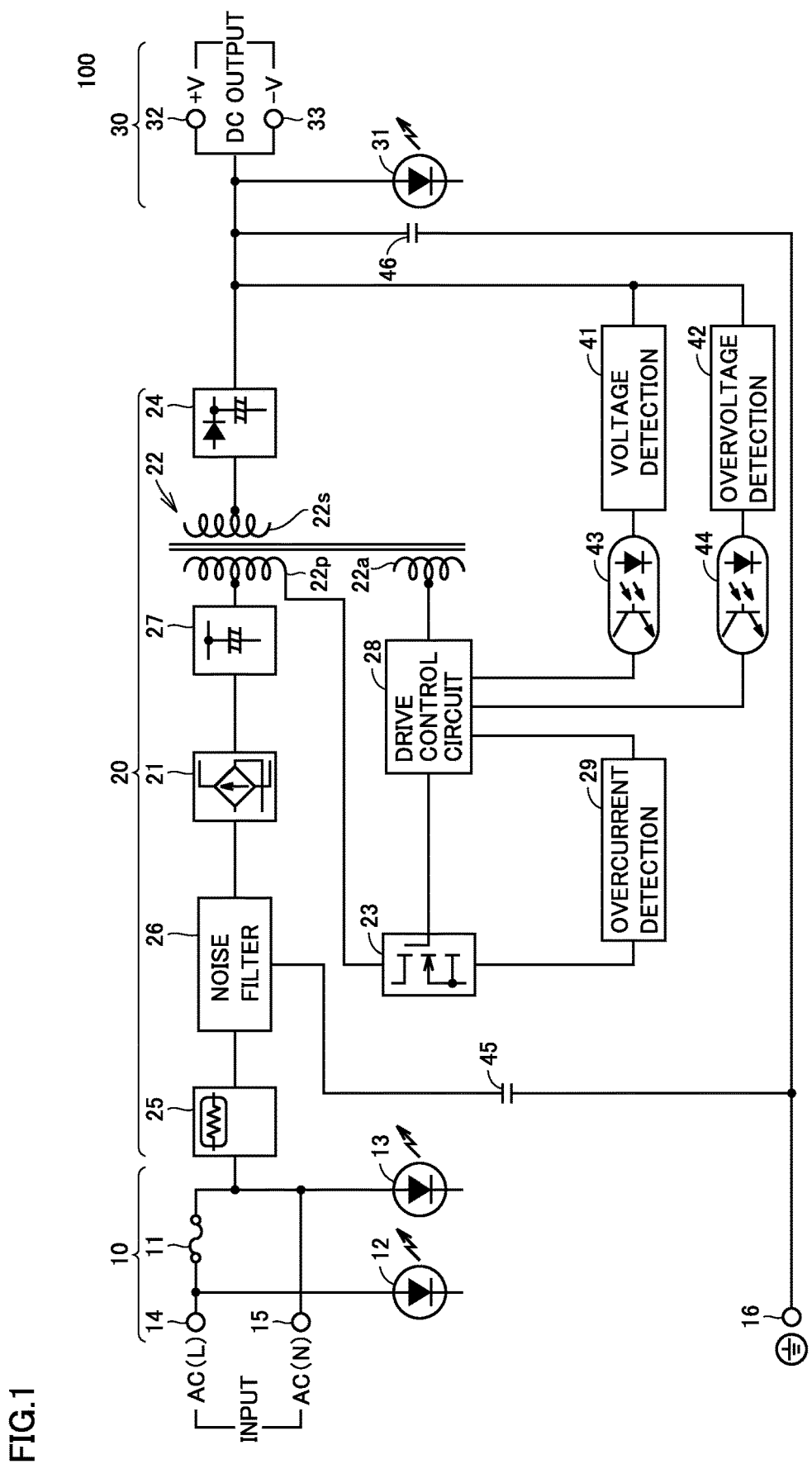
FIG. 1 is a block diagram showing one configuration example of a power supply device according to an embodiment.

An embodiment is hereinafter described in detail with reference to the drawings. In the drawings, identical reference numerals or characters denote identical or corresponding parts.

<Application>

First of all, one example situation to which the present invention is applicable is described with reference to FIG. 1. FIG. 1 is a block diagram showing one configuration example of a power supply device 100 according to an embodiment. As shown in FIG. 1, power supply device 100 is, for example, a switching power supply device. Power supply device 100 includes an input unit 10 to receive an input voltage from outside, a power supply unit 20, and an output unit 30.

For example, input unit 10 is connected to an AC power supply (e.g. a commercial power supply with 50 Hz/60 Hz, 100 V/200 V) 1. Input unit 10 includes input terminals 14, 15 (also denoted by "INPUT"), a fuse 11 which is a protective circuit connected to input terminal 14, and a protective earth terminal 16.

Power supply unit 20 generates a power-supply voltage from the voltage inputted through input unit 10. As an example, power supply unit 20 includes a rectifier circuit 21, a transformer 22, a MOSFET 23 as a switching device, and a rectifying-smoothing circuit 24. Further, power supply unit 20 includes a rush current limiting circuit 25, a noise filter 26, a smoothing circuit 27, a drive control circuit 28, an overcurrent detection circuit 29, a voltage detection circuit 41, an overvoltage detection circuit 42, a photo coupler 43, a photo coupler 44, and capacitors 45, 46.

Rush current limiting circuit 25 comprises, for example, a resistor and a relay inserted in parallel with the resistor. The relay opens to prevent a rush current for several tens of milliseconds from a start-up. After that, the relay closes and power supply device 100 starts up.

Noise filter 26 filters out a high-frequency noise component superimposed on the AC voltage inputted to INPUT, and supplies rectifier circuit 21 with the AC voltage including no noise component. Smoothing circuit 27 comprises a smoothing capacitor to smooth the voltage after full-wave rectification.

Transformer 22 includes a primary winding 22p, a secondary winding 22s, and an auxiliary winding 22a. Transformer 22 induces a high-frequency pulse voltage generated in primary winding 22p into secondary winding 22s and auxiliary winding 22a. The high-frequency pulse voltage induced into secondary winding 22s is used for DC output. The high-frequency pulse voltage induced into auxiliary winding 22a is used for start-up of drive control circuit 28.

Rectifying-smoothing circuit 24 comprises a rectifier circuit and a smoothing capacitor. Rectifying-smoothing circuit 24 rectifies and smoothes the high-frequency pulsed power supply (AC power supply) induced into secondary winding 22s of transformer 22, and generates a DC output having a predetermined output voltage and output current.

Voltage detection circuit 41 detects the output voltage of the DC output power supply as a corresponding step-down voltage. Photo coupler 43 outputs, to drive control circuit 28, a signal corresponding to the detected step-down voltage. Overvoltage detection circuit 42 detects an overvoltage when the output voltage of the DC output power supply exceeds a predetermined voltage. Photo coupler 44 outputs, to drive control circuit 28, a signal representing the detection of an overvoltage.

Drive control circuit 28 comprises a control IC including, for example, a pulse width modulation (PWM) signal generator, a feedback control circuit, an over current protection (OCP) terminal, a switching drive terminal, and a drive power terminal. Drive control circuit 28 drives MOSFET 23 by supplying the PWM signal to the gate of MOSFET 23.

The secondary-side voltage detected by voltage detection circuit 41 is fed back to drive control circuit 28 via photo coupler 43. Drive control circuit 28 changes the duty cycle of the PWM signal based on this voltage, and drives MOSFET 23 so that the power-supply voltage (output voltage) will be a predetermined voltage.

MOSFET 23 is connected in series with primary winding 22p of transformer 22. MOSFET 23 turns on and off the primary-side voltage in response to the PWM signal supplied from drive control circuit 28, and generates a high-frequency pulsed power supply at primary winding 22p of transformer 22.

Output unit 30 includes output terminals 32, 33. The power-supply voltage generated in power supply unit 20 is outputted from output terminals 32, 33 (also denoted by "DC OUTPUT"). In the configuration shown in FIG. 1, a DC voltage is outputted as the power-supply voltage.

Power supply device 100 further includes an LED circuit 12, an LED circuit 13, and an LED circuit 31, as lighting circuits. Each of LED circuits 12, 13, and 31 includes an LED (light-emitting device). LED circuit 12 is connected to input terminal 14 and is turned on in response to application of an input voltage to input terminal 14 LED circuit 13 is disposed between fuse 11 and power supply unit 20 and is turned on in response to input of a voltage to power supply unit 20 through fuse 11. LED circuit 31 is connected to output terminals 32, 33 and is turned on in response to an output from power supply unit 20.

FIG. 2 shows lighting patterns of the LED circuits according to one embodiment. In FIG. 2, "input 1", "input 2", and "output 1" respectively represent LED circuit 12, LED circuit 13, and LED circuit 31. Each of LED circuits 12, 13, 31 has two states, ON and OFF, and therefore there are 2×2×2=8 patterns in total. FIG. 2 describes all possible lighting patterns.

Pattern 1 is a pattern in which all of input 1, input 2, and output 1 are ON. Pattern 1 indicates that power supply device 100 is operating normally. The internal state of power supply device 100 is a normal state.

Pattern 2 is a pattern in which input 1 and input 2 are ON, and output 1 is OFF. Pattern 2 indicates the presence of an abnormality on the secondary side of power supply unit 20 (the abnormality may be, for example, a short circuit on the output side or breakage on the secondary side).

Pattern 3 is a pattern in which input 1 and output 1 are ON, and input 2 is OFF. However, it is impossible for power supply device 100 to have an internal state corresponding to this pattern.

Pattern 4 is a pattern in which input 1 is ON, and input 2 and output 1 are OFF. Pattern 4 indicates the presence of an abnormality, such as melt of fuse 11 or breakage on the primary side of power supply unit 20.

Pattern 5 is a pattern in which input 1 is OFF, and input 2 and output 1 are ON. Pattern 5 indicates that power supply device 100 is in the state of a holding time. However, the state may not actually occur.

Pattern 6 is a pattern in which input 1 and output 1 are OFF, and input 2 is ON. However, it is impossible for power supply device 100 to have an internal state corresponding to this pattern.

Pattern 7 is a pattern in which input 1 and input 2 are OFF, and output 1 is ON. This state may occur when a voltage is applied from outside of power supply device 100, for example.

Pattern 8 is a pattern in which all of input 1, input 2, and output 1 are OFF, with no input voltage.

In an embodiment, the lighting mode of LED circuit 12 is varied depending on the input voltage of power supply device 100. Thus, in patterns 1 to 4 shown in FIG. 2. (i.e., the patterns in which "input 1" is ON), the lighting mode of LED circuit 12 is varied depending on the input voltage of power supply device 100. This enables the user to check whether or not an intended input voltage is being applied to power supply device 100. Thus, a power supply device that enables the user to easily check the level of input voltage can be provided.

<Configuration of LED Circuit of Input 1 and Lighting Method>

FIG. 3 is a circuit diagram showing a configuration example of LED circuit 12 (lighting circuit) shown in FIG. 1. With reference to FIG. 3, LED circuit 12 includes a diode 50, Zener diodes 51, 52, 53, 54, resistors 61, 62, 63, 64, and LEDs 71, 72, 73, 74.

Zener diodes 51, 52, 53, 54 are respectively connected to LEDs 71, 72, 73, 74, on their high-voltage side (anode side). Further, Zener diodes 51, 52, 53, 54 are connected in series.

Specifically, diode 50, Zener diode 51, resistor 61, and LED 71 are connected in series. Zener diode 52, resistor 62, and LED 72 are connected in series; and the cathode of Zener diode 52 is connected to the anode of Zener diode 51. Similarly, Zener diode 53, resistor 63, and LED 73 are connected in series; and the cathode of Zener diode 53 is connected to the anode of Zener diode 52. Zener diode 54, resistor 64, and LED 74 are connected in series; and the cathode of Zener diode 54 is connected to the anode of Zener diode 53.

According to this circuit, the number of LEDs to be turned on can be varied depending on the input voltage. Specifically, as the input voltage increases, the number of LEDs to be turned on increases. In a first range of the input voltage, LED 71 is ON. In a second range of the input voltage, LEDs 71, 72 are ON. In a third range of the input voltage, LEDs 71, 72, 73 are ON. In a fourth range of the input voltage, LEDs 71, 72, 73, 74 are ON. By appropriately selecting the breakdown voltages (Zener voltages Vz) of Zener diodes 51, 52, 53, 54, LED circuit 12 can be adjusted so that LEDs 71, 72, 73, 74 are turned on at intended input voltages.

With the above-described configuration, the lighting of LEDs 71 to 74 can be synchronized with the input of the power supply device. Accordingly, when an instantaneous voltage drop occurs in the input power source for example, the number of lighted LEDs is decreased, thus enabling the user to know the occurrence of the instantaneous voltage drop.

FIG. 4 schematically shows one example external appearance of power supply device 100 according to an embodiment of the present invention. As shown in FIG. 4, on the face of power supply device 100 where INPUT terminals and DC-OUTPUT terminals are disposed, display circuits 81a to 81f, LED circuit 12 (LEDs 71 to 74), a display switching/resetting key 82, a communication port 83, and an output voltage adjusting trimmer 84 are placed. The layout shown in FIG. 4 is by way of example.

Display circuit 81a comprises, for example, a seven-segment LED. Display circuit 81a may be an LCD, an organic electroluminescent display, or the like. For example, display circuit 81a displays an output voltage, an output current, a lifespan before replacement, a total operating time, and the like.

LED circuit 12 varies the number of LEDs to he turned on depending on the magnitude of the input voltage.

Each of display circuits 81b, 81c, 81d includes an LED. For example, when an input voltage is normally inputted to power supply unit 20 of power supply device 100, the LED of display circuit 81d is ON. When a DC voltage is outputted from power supply device 100, the LED of display circuit 81b is ON. On the other hand, when an abnormality occurs in power supply device 100, the LED of display circuit 81c is ON. Display circuit 81d and display circuit 81b are implementations of LED circuit 12 and LED circuit 31, respectively, shown in FIG. 1, for example.

Display circuit 81e and display circuit 81f include LEDs. The lighting of the LEDs indicates the communication status of communication port 83.

Display switching/resetting key 82 is operated to switch the parameters to be displayed. Also, display switching/resetting key 82 is operated to reset the communication settings. Output voltage adjusting trimmer 84 is operated to adjust the output voltage.

The power supply device shown in FIG. 4 is disposed on a control board at a manufacturing location, for example. At a manufacturing location, interconnections (power-supply lines) for different power-supply voltages may be laid. If a power supply device meant for a certain power-supply line (e.g. a line for AC of 230 V) is connected to a power-supply line for a lower voltage (e.g. a line for AC of 115 V), the output or efficiency of the power supply device may reduce.

In the present embodiment, the lighting mode of LED circuit 12 is varied depending on the magnitude of the input voltage. Specifically, the number of LEDs to be turned on is varied depending on the magnitude of the input voltage. Thus, the user can check whether or not an intended input voltage is being applied to power supply device 100. Also, a change in the number of lighted LEDs enables the user to know a change in input voltage level. Thus, when an instantaneous drop in input voltage of power supply device 100 occurs for example, the user can know the occurrence of the instantaneous voltage drop.

In the above-described embodiment, the power supply device uses a plurality of LEDs to indicate the range of the input voltage. However, in the present embodiment, another lighting mode of LED may be employed. For example, the emission color of an LED(s) may be varied depending on the range of the input voltage.

[Additional Notes]

As described above, the present embodiment includes the following disclosure.

(Configuration 1)

A power supply device (100) comprising:

an input unit (10) configured to receive an input voltage from outside;

a power supply unit (20) configured to generate a power-supply voltage from the input voltage inputted through the input unit (10);

an output unit (30) including an output terminal (32, 33) configured to output the power-supply voltage; and a lighting circuit (12) connected to the input unit (10) and configured to be turned on in response to application of the input voltage, the lighting circuit (12) being configured to vary in lighting mode depending on the input voltage.

(Configuration 2)

The power supply device (100) according to configuration 1, wherein the lighting circuit (12) includes a plurality of light-emitting devices (71 to 74), and the number of light-emitting devices to be turned on among the plurality of light-emitting devices (71 to 74) is varied depending on the magnitude of the input voltage.

(Configuration 3)

The power supply device (100) according to configuration 2, wherein the lighting circuit (12) further includes a plurality of Zener diodes (51 to 54) each connected to a high-voltage side of a corresponding one of the plurality of light-emitting, devices (71 to 74), and the plurality of Zener diodes (51 to 54) are connected in series.

It should be understood that the embodiment disclosed herein is by way of example in every respect and without limitation. The scope of the present invention is defined by the terms of the claims, and is intended to include any modification within the meaning and scope equivalent to the terms of the claims.

What is claimed is:

1. A power supply device comprising:
an input terminal configured to receive an input voltage;
a protective circuit connected to the input terminal;
a power supply unit connected to the protective circuit and configured to generate a power-supply voltage from the input voltage inputted through the protective circuit;
an output unit connected to the power supply unit and comprising an output terminal configured to output the power-supply voltage;
a first lighting circuit connected to the input terminal and configured to be turned on by receiving the input voltage from the input terminal; and
a second lightning circuit connected to the protective circuit and configured to be turned on by receiving the input voltage from the protective circuit; and
a third lighting circuit connected to an output side of the power supply unit and configured to be turned on by receiving the power-supply voltage from the power supply unit, wherein
the first lighting circuit is connected to the input terminal and the second lighting circuit is connected to the protective circuit such that a state in which the first lighting circuit is turned on and the second lighting circuit is turned off indicates an abnormality in the protective circuit, and wherein the first lighting circuit is connected to the input terminal, the second lighting circuit is connected to the protective circuit, and the third lighting circuit is connected to the output side of the power supply unit such that a state in which the first to third lighting circuits are turned on indicates a normality in the protective circuit and the power supply unit, and a state in which the first lighting circuit is turned on, the second lighting circuit is turned on, and the third lighting circuit is turned off indicates a normality in the protective circuit, and an abnormality in the power supply unit or an abnormality on the output side of the power supply unit.

2. The power supply device according to claim 1, wherein the first lighting circuit comprises a plurality of light-emitting devices, and a number of light-emitting devices to be turned on among the plurality of light-emitting devices is varied depending on a magnitude of the input voltage.

3. The power supply device according to claim 2, wherein the first lighting circuit further comprises a plurality of Zener diodes each connected to a high-voltage side of a corresponding one of the plurality of light-emitting devices, and the plurality of Zener diodes are connected in series.

4. The power supply device according to claim 3, wherein the plurality of light-emitting devices comprises first to fourth light-emitting devices, the plurality of Zener diodes comprises first to fourth Zener diodes, the first Zener diode, a first resistor, and the first light emitting diode are connected in series, the second Zener diode, a second resistor, and the second light emitting diode are connected in series, the third Zener diode, a third resistor, and the third light emitting diode are connected in series, the fourth Zener diode, a fourth resistor, and the fourth light emitting diode are connected in series, the second Zener diode is connected to the first Zener diode, the third Zener diode is connected to the second Zener diode, and the fourth Zener diode is connected to the third Zener diode.

5. The power supply device according to claim 2, wherein the power supply device further comprises a housing including a front surface, wherein the input terminal and the output terminal are arranged on the front face, and the plurality of light-emitting devices are arranged on the front surface of the housing.

6. The power supply device according to claim 5, wherein the plurality of light-emitting devices are arranged in line on the front surface of the housing.

\* \* \* \* \*